US006319415B1

United States Patent
Schade

(10) Patent No.: US 6,319,415 B1
(45) Date of Patent: Nov. 20, 2001

(54) METHOD AND APPARATUS FOR AXIAL FLOW FILTRATION

(76) Inventor: Harvey R. Schade, 4432 W. Rotamer Rd., Janesville, WI (US) 53546

( * ) Notice: Subject to any disclaimer, the term of this patent is extended or adjusted under 35 U.S.C. 154(b) by 0 days.

(21) Appl. No.: 09/564,558

(22) Filed: May 4, 2000

(51) Int. Cl.[7] .................................................. B01D 27/07
(52) U.S. Cl. ........................ 210/767; 210/439; 210/440; 210/450; 210/455; 210/497.1
(58) Field of Search .................................. 210/439, 455, 210/493.4, 497.1, 438, 440, 450, 767

(56) References Cited

U.S. PATENT DOCUMENTS 3,504,803 * 4/1970 Brayman ............................. 210/439
4,017,400 * 4/1977 Schade ............................... 210/439
5,143,575 * 9/1992 Glassel et al. ..................... 210/439

* cited by examiner

Primary Examiner—Matthew O. Savage
(74) Attorney, Agent, or Firm—H. Keith Schoff

(57) ABSTRACT

A packaged fluid filter comprises a sealed canister fitted with fluid inflow means and fluid outflow means which communicate internally of the canister respectively with proximal ends of an axial flow filter element hollow core spool, and outflow face of wound tissue laid on said core spool, thereby serving to eliminate need for a fixed spool holder internally of the canister.

2 Claims, 2 Drawing Sheets

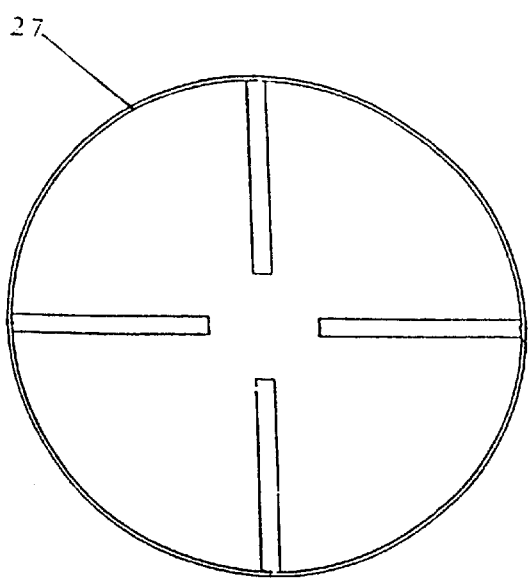
FIG. 2
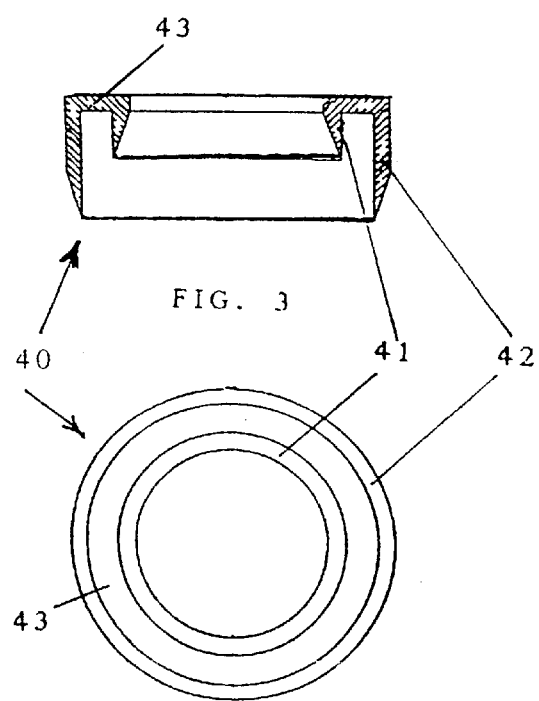
FIG. 3
FIG. 4

METHOD AND APPARATUS FOR AXIAL FLOW FILTRATION

FIELD OF ART

Packaged fluid filters are widely used in industry and commerce, for example, as motor lubricating oil filters for stationary engines and automotive vehicles.

BACKGROUND OF INVENTION

Disposable, packaged, motor lubricating oil filter units are often of clamp-on or screw-on types which communicate a central axial fluid flow passage and an annular fluid gallery passage with appropriate pressurized fluid passages in an internal combustion engine block.

BRIEF DESCRIPTION OF THE INVENTION

Conventional packaged fluid flow filters utilize clamping structure carried by the housing canister to securely fix a filter element into contact with a fluid entry passage fitting. This is a necessary provision for preventing leakage from occurring as a result of fluid pressure acting to dislodge the filter element from its seat. Packaged filter structures often comprise a fixed standpipe disposed in the core space of spiral wound tissue filter element for the purpose of securing the filter element in place.

The packaged filter of this invention eliminates the need for clamping structure by utilizing fluid pressure within the housing canister to maintain a tissue filter element properly seated. By conducting pressurized inflowing fluid through the core passage of the filter element to a gallery extending across the face of the wound tissue filter element distal from its seat.

Hydraulic pressure is exerted on the filter element which acts to maintain the filter element core spool properly seated at its proximal end. To define the gallery and to prevent fluid leakage from the distal end of the filter element around the periphery of the filter element from occurring, a cap structure having an annular wall portion is provided facing the distal end of the filter element with the annular wall portion being partially received around te filter element tissue windings. A further overlay of tissue windings is provided around a partial length of the filter element and extends beyond the distal face of the filter element as a skirt encompassing the annular wall of the cup. When the canister is assembled, the open end face is closed by an end cover being forcibly applied and secured thereon by rolling, crimping or other manner to provide a permanent seal. The wound tissue skirt portion, by forcible application of the end cover to the canister, is squeezed between the cup and the curved wall of the canister thereby providing a seal against fluid leakage around the distal end of the filter element.

To similarly provide a seal against fluid leakage at the proximal end of the core spool, a collet may be provided comprising two axially extending annular wall portions, one disposed one for being forcible inserted between the proximal end portion of the core spool and the fluid entry passage fitting, and the other interstitially between tissue windings lying radially outward from the proximal end of the core spool.

BRIEF DESCRIPTION OF THE DRAWINGS

FIG. 2 is a bottom view of a spacer disposed adjacent the inflow face of a filter element of the packaged fluid filter of FIG. 1;

FIG. 3 is a cross-sectional side elevation of a collet of the packaged fluid filter of FIG. 1;

FIG. 4 is a bottom view of the collet of FIG. 3.

DESCRIPTION OF THE INVENTION

Figure 1:
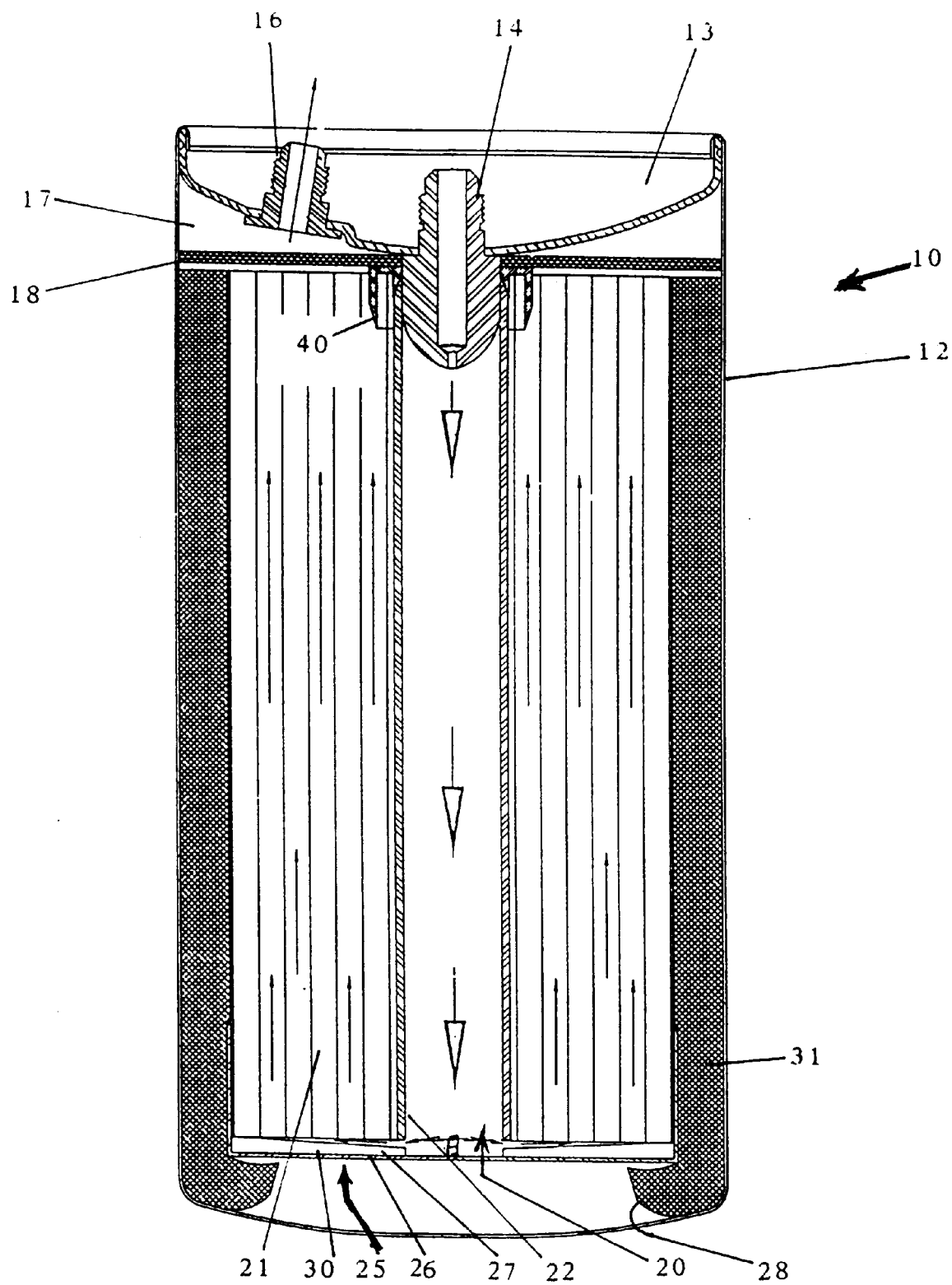
FIG. 1 is a cross-sectional side elevation of a preferred embodiment of a packaged fluid filter of this invention.

In FIG. 1, cylindrical packaged filter 10 is shown assembled from one-piece cup 12 with sealably rolled-on or crimped end closure 13. Fluid inlet fitting 14 is secured in end closure 13 co-axally coincident with cup 12. Fluid outlet fitting 16 is secured in end closure 13 in off-center disposition. As shown, both of fittings 14 and 16 are threaded for being operably connected to associated means, but other connecting means may be provided, if desired.

Filtered fluid collection gallery 17 underlies end closure 13, with screen 18 disposed therein spanning the annlular cross-sectional area of canister 11 around fluid inlet fitting 14. Subjacent to gallery 17 in FIG. 1, fluid filter element 20 is shown comprising spirally wound tissue layers 21, which in FIG. 1 depiction is symbolized by upward directed arrows indicating direction of fluid flow through the filter element. Filter 10 further comprises hollow core spool 22 on which tissue layers 21 are wound. Downward directed arrows within core spool 22 indicate direction of fluid flow through the core spool.

Filter element cap 25 is shown in FIG. 1 as being of shallow form embodying base portion 26 and a low circumferential wall portion which encloses a lower extremity portion of fluid filter element 20. Unfiltered fluid gallery 30 occupies the space between the lower inflow face of filter element 20 as shown in FIG. 1 and base portion 26 of filter element cap 25. As shown spacer 27 is disposed within gallery 30, and is of radial cruciform configuration with an encircling rim and open center as shown in FIG. 2. The provision of spacer 27 is preferred, but is not required for utility of packaged filter 10.

To maintain filter element 20 firmly seated on fluid flow inlet fitting 14 and further to prevent channeling flow from occurring in or around filter element 20, additional spiral wrappings 31, preferably, but not necessarily comprising filter medium tissue 21, are laid around at least a lower extremity portion of filter element 20 as shown in FIG. 1 and around cap 25 to provide skirt portion 28 axially extending beyond base portion 26 of cap 25 as shown in FIG. 1. When packaged fluid filter 10 is assembled during manufacture, end closure 13 and cup 12 are forcibly brought together to position the parts for being permanently joined, whether by rolling of closure end 13 onto cup 12 rim or otherwise, In the process, core spool 22 is squeezed onto fluid flow inlet fitting 14 and skirt portion 28 is squeezed between cap 25 and cup 12, in both cases providing seats against fluid flow leakage.

To further reduce the possibility of leakage by channeling flow of fluid, collet 40 as shown in FIGS. 1, 3, and 4, is provided on fluid flow inlet fitting 14 in a preferred embodiment of this invention. Collet 40 is configured with collar portion 43 carrying annular flanges 41 and 42 disposed axially coincident with core spool 22. Flanges 41 and 42 are depicted as having chisel edges at the free ends directed to force, respectively, core spool 22 radially inward against fluid inlet fitting 14 and to press tissue layers 21 radially outward to eliminate channeling flow immediately around fluid inlet fitting 14. In an alternative embodiment, collet 40 may be configured with either one or both annular flanges eliminated or collet 40 may be eliminated entirely, but that is not preferred.

The construction of the packaged filter of this invention utilizes differential in fluid pressure between the inlet and outlet faces of a filter element to forcibly seat and maintain a filter element sealably in contact with an inlet fitting thereby to eliminate the need for application of mechanical means to provide the necessary seating force. Accordingly, elements of structure as heretofore has been required in package filter apparatus to provide mechanical seating force are eliminated.

I claim:

1. Axial flow fluid filtration apparatus comprising in combination:
   a) a canister comprising a cup portion and an affixed end cover portion,
   a canister fluid flow inlet port fitting extending through said cover portion for receiving flow of fluid into said canister,
   a canister fluid flow outlet port fitting extending through said cover portion.

2. A method for providing axial, pressurized fluid flow filtration utilizing tissue filter medium wound about a spool, wherein a distal end of said tissue filter medium and spool are partially received within a cap having an end face and an annular wall portion, a cannister having a closed end and an open end that is closed by a cover equipped with an inlet fitting and an outlet fitting, wherein said medium spool, and cover are disposed within said canister and a proximal end of said medium and spool are positioned proximate said cover, and wherein there is no need for a further structural element in said spool, comprising the steps of:
   a) encompassing said cap and at least a part of said wound tissue medium with a wrapping comprising tissue wound co-axially with said wound tissue filter medium wherein said wrapping extends beyond said end face of said cap,
   b) disposing the proximal end of said spool proximal to said inlet fitting in sealable communication with said inlet fitting,
   c) providing a communicating passage for fluid flow between the distal end of said spool and the distal end of said wound tissue medium and said end face of said cap,
   d) providing a communicating passage for fluid flow between said proximal end of said wound tissue filter medium and said outlet fitting,
   e) inserting said spool, said wound filter tissue medium, said cap, and said wrapping into said canister forcibly to squeeze said skirt portion between said cap and said canister cup portion thereby to prevent fluid by-pass flow around said wound tissue filter medium.

\* \* \* \* \*